United States Patent
Woo et al.

(10) Patent No.: US 8,130,345 B2
(45) Date of Patent: Mar. 6, 2012

(54) LIQUID CRYSTAL DISPLAY

(75) Inventors: Jonghoon Woo, Gyeonggi-do (KR);
Youngbok Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 625 days.

(21) Appl. No.: 12/314,914

(22) Filed: Dec. 18, 2008

(65) Prior Publication Data
US 2009/0190074 A1   Jul. 30, 2009

(30) Foreign Application Priority Data

Dec. 26, 2007   (KR) .................. 10-2007-0138031

(51) Int. Cl.
*G02F 1/1335*   (2006.01)
(52) U.S. Cl. .................. 349/108; 349/106; 349/107
(58) Field of Classification Search ........... 349/106–108
See application file for complete search history.

(56) References Cited

U.S. PATENT DOCUMENTS

| | | | |
|---|---|---|---|
| 2007/0008466 A1* | 1/2007 | Horiguchi | 349/113 |
| 2009/0190074 A1* | 7/2009 | Woo et al. | 349/106 |

* cited by examiner

*Primary Examiner* — Phu Vu
(74) *Attorney, Agent, or Firm* — Morgan, Lewis & Bockius LLP

(57) ABSTRACT

Disclosed is a liquid crystal display which can switch between a wide viewing angle and a narrow viewing angle in a quad type pixel structure including white subpixels. The liquid crystal display comprises: a plurality of quad type pixels each having an R subpixel, a G subpixel, a B subpixel, and a W subpixel; and a plurality of light blocking patterns disposed on the W subpixels, for guiding light from the W subpixels to a side viewing angle, wherein the W subpixels are fixed at specific positions of the quad type pixels respectively, and the R, G, and B subpixels have a different arrangement for each of the quad type pixels adjacent horizontally or vertically to each other.

7 Claims, 9 Drawing Sheets

R:PR  G:PG  B:PB  W:PW

R:PR  G:PG  B:PB  W:PW

R:PR  G:PG  B:PB  W:PW

LIQUID CRYSTAL DISPLAY

This application claims the benefit of Korean Patent Application No. 10-2007-0138031 filed on Dec. 26, 2007, which is hereby incorporated by reference in its entirety.

BACKGROUND OF THE INVENTION

1. Field of the Invention

This document relates to a liquid crystal display, more particularly, to a liquid crystal display which can switch between a wide viewing angle and a narrow viewing angle by comprising white subpixels.

2. Related Art

In the recent information society, display devices have been in the spotlight as visual information transfer media. In recent years, a cathode ray tube or a Braun tube becoming the mainstream is problematic in the heavy weight and bulky size. Various kinds of panel displays which can overcome the limitations of the cathode ray tube have been developed.

Flat panel display devices include liquid crystal display (LCD) devices, field emission display (FED) devices, plasma display panel (PDP) devices and an electroluminescence (EL) displays. Most of these display devices are already available on the market.

Among them, the liquid crystal display device is on a trend of its application scope being broadened due to characteristics such as light weight, thinness, lower power consumption drive and the like. According to this trend, the liquid crystal display devices are used in portable computers, such as notebook PCs, office automation equipment, audio/video equipment, outdoor and indoor advertisement displays, and so on. The liquid crystal display devices control the transmissivity of a light beam in accordance with a video signal applied to a plurality of control switches, which are arranged in a matrix, thereby displaying a desired picture on a screen. Due to the result of research and development and the use of mass production technology, the liquid crystal display device has rapidly been developed to be of large size and high resolution.

Recently, there has been suggested a liquid crystal display device in which pixels formed on a liquid crystal display panel for security and privacy protection comprises a plurality of quad type pixels each having one white subpixel (hereinafter, referred to as "W subpixel") for viewing angle adjustment and three RGB subpixels, rather than comprising stripe type RGB subpixels. A light blocking member (hereinafter, referred to as "barrier") is disposed on the W subpixel of the quad type pixels, spaced apart a predetermined gap, and guides light from the W subpixel toward a side viewing angle to reduce visibility from the sides, thereby enabling the implementation of a narrow viewing angle. By such a liquid crystal display device, the switching between a wide viewing angle mode and a narrow viewing angle mode can be arbitrarily controlled by the turn on/off of the W subpixel.

In the wide viewing angle mode, a quad type pixel is driven only by RGB subpixels PR, PG, and PB, with the W subpixel PW being turned off. As the W subpixel PW is turned off, there is generated no leaked light that deteriorates the visibility from a side viewing angle. Since the visibility is maintained well in both of the front and side viewing angle directions, the wide viewing angle mode is implemented.

In the narrow viewing angle mode, a quad type pixel is driven by all of the RGBW subpixels PR, PG, PB, and PW including the W subpixel PW. The W subpixel PW is turned on and the W subpixels PW and the barrier are spaced apart a predetermined gap from each other. Thus, from a side viewing angle, as shown in the drawing, the visibility is reduced much due to the affect of a leaked light from the W subpixel PW. On the contrary, from the front viewing angle, a leaked light from the W subpixel PW is blocked by the barrier. In this manner, while the visibility is maintained well in a front viewing angle direction, the visibility is lowered much in a side viewing angle direction, thereby implementing the narrow viewing angle mode.

By the way, as stated above, the liquid crystal display device having such a quad type pixel structure has the barrier spaced apart a predetermined gap from W subpixels PW. Hence, the degree of light shielding of the barrier on the RGB subpixels PR, PG, and PB in the side viewing angle directions is varied according to a viewing angle. For example, as shown in FIG. 3, there is a big difference in the degree of light shielding by the barrier among an image of the B subpixels PB viewed from □, an image of the G subpixels PG viewed from □. The difference in the degree of light shielding of the barrier on the RGB subpixels PR, PG, and PB leads to a difference in the size of RGP aperture regions exposed according to a side viewing angle, and this occurs in both of the wide viewing angle mode and the narrow viewing angle mode.

When the size of RGP aperture regions exposed in a side viewing angle direction is varied according to a viewing angle, if all of the subpixels of the quad type pixel as shown in FIG. 4 are fixedly disposed at specific positions, the observer senses the image of the B subpixels PB relatively much less than the images of the R and G subpixels PR and PG from a side viewing angle. This causes a greenish or yellowish color shift at a side viewing angle, and hence acts as a primary factor to destroy white balance and deteriorate display quality at a side viewing angle.

SUMMARY

An aspect of this document is to provide a liquid crystal display having quad type pixels capable of switching between a wide viewing angle and a narrow viewing angle, which can prevent a color shift by compensating for a difference in the degree of light shielding in a side viewing angle direction.

To accomplish the foregoing object, there is provided a liquid crystal display according to an embodiment of the present invention, comprising: a plurality of quad type pixels each having an R subpixel, a G subpixel, a B subpixel, and a W subpixel; and a plurality of light blocking patterns disposed on the W subpixels, for guiding light from the W subpixels to a side viewing angle, wherein the W subpixels are fixed at specific positions of the quad type pixels respectively, and the R, G, and B subpixels have a different array for each of the quad type pixels adjacent horizontally or vertically to each other.

Each of the quad type pixels is formed in a quadrangular structure including the R, G, and B subpixels and the W subpixel.

A quad type pixel having subpixels arranged in the order of B-R-G is adjacently disposed at the right side of a quad type pixel having subpixels arranged in the order of R-G-B; a quad type pixel having subpixels arranged in the order of B-R-G is adjacently disposed below the quad type pixel having subpixels arranged in the order of R-G-B; a quad type pixel having subpixels arranged in the order of G-B-R is adjacently disposed at the left side of the quad type pixel having subpixels arranged in the order of R-G-B; and a quad type pixel having subpixels arranged in the order of G-B-R is adjacently disposed above the quad type pixel having subpixels arranged in the order of R-G-B.

In the quad type pixels, the arrangement order of the R, G, and B subpixels is repeated in units of 3 (quad type pixels)×3 (quad type pixels).

The light blocking patterns are patterned on a transparent glass substrate, and the glass substrate having the light blocking patterns is attached to an image display surface of the liquid crystal display panel having the quad type pixels.

The size of the light blocking patterns is larger than the aperture area of the W subpixels.

The aperture area of the W subpixels is equal to the aperture area of the respective R, G, and B subpixels.

The aperture area of the W subpixels is smaller than the aperture area of the respective R, G, and B subpixels.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

In the drawings.

DETAILED DESCRIPTION

Hereinafter, an implementation of this document will be described in detail with reference FIGS. 5 to 15.

Figure 5:
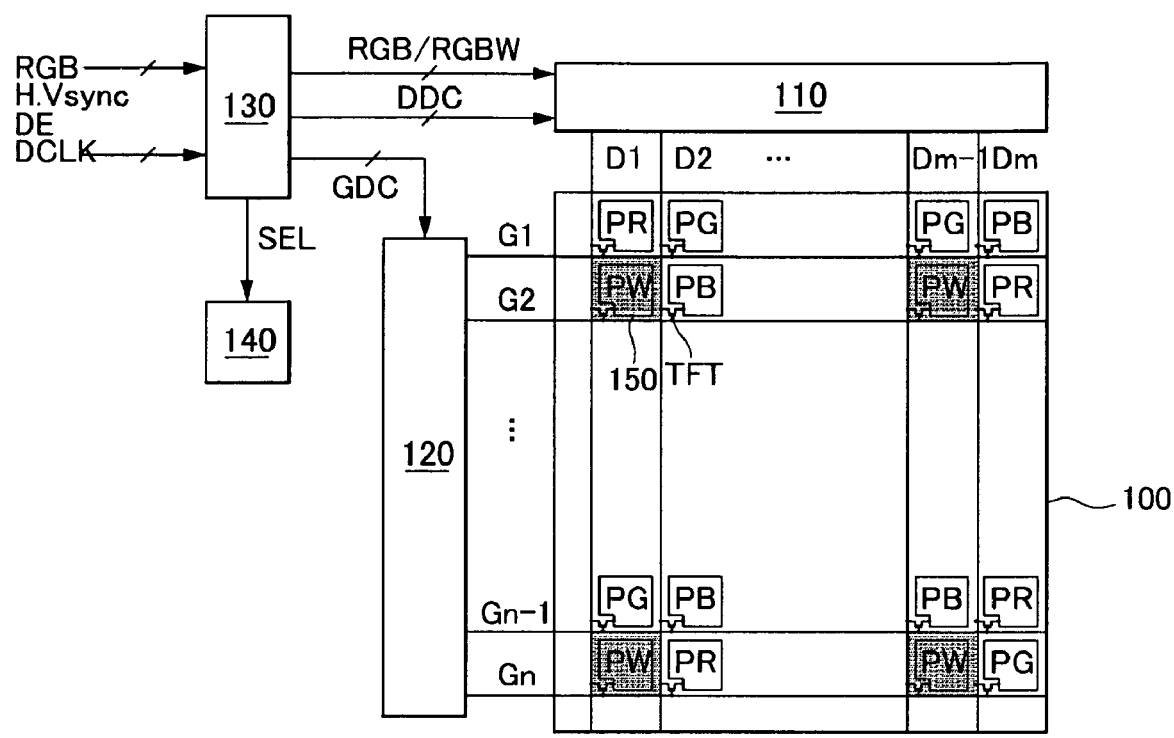
FIG. 5 is a block diagram showing a liquid crystal display according to an embodiment of the present invention.

FIG. 5 is a block diagram showing a liquid crystal display according to an embodiment of the present invention.

Referring to FIG. 5, the liquid crystal display of the present invention comprises a liquid crystal display panel 100 in which data lines D1 to Dm cross gate lines G1 to Gn, and a thin film transistor TFT for driving subpixels PR, PG, PB, and PW is formed at each of the crossing parts, a barrier pattern 150 patterned to correspond to the W subpixels PW of the liquid crystal display panel 100, and disposed on an image display surface of the liquid crystal display panel 100 in order to block light from the W subpixels PW in a front viewing angle direction and leak the light in a side viewing angle direction, a data driver 110 for supplying data to the data lines D1 to Dm of the liquid crystal display panel 100, a gate driver 120 for supplying scan pulses to the gate lines G1 to Gn of the liquid crystal display panel 100, a timing controller 130 for selectively outputting RGB data and RGBW data in accordance with an input viewing angle selection signal SEL and controlling the driving timing of the drivers 110 and 120, and a user interface 140 for inputting a viewing angle selection signal SEL so as to selectively drive in a wide viewing angle mode or in a narrow viewing angle mode.

The data lines D1 to Dm and the gate lines G1 to Gn are formed to cross each other at a predetermined gap in a lower substrate of the liquid crystal display panel 100. R, G, and B subpixels PR, PG, and PB for original image representation and a W subpixel PW for viewing angle adjustment are formed at the crossing regions of the data lines D1 to Dm and the gate lines G1 to Gn. The thin film transistor TFT is electrically connected to each of the subpixels PR, PG, PB and PW included in one unit pixel. In response to scan pulses from the gate lines G1 to Gn, the thin film transistor TFT is turned on and applies R, G, and B data voltages supplied from the data lines D1 to D, to pixel electrodes of the R, G, and B subpixels PR, PG, and PB. In addition, in response to scan pulses from the gate lines G1 to Gn, the thin film transistor TFT is turned on and applies a white data voltage (hereinafter, referred to as "W data voltage") supplied from the data lines D1 to Dm to a pixel electrode of the W subpixel PW. To this end, a gate electrode of the thin film transistor TFT is connected to the gate lines G1 to Gn. A source electrode of the thin film transistor TFT is connected to the data lines D1 to DL. A drain electrode of the thin film transistor TFT is connected to the pixel electrodes of the subpixels PR, PG, PB, and PW. A common electrode for forming an electrical field while facing the pixel electrodes is formed on the upper substrate in devices employing a vertical electric field driving method, such as a TN (Twisted Nematic) mode or a VA (Vertical Alignment) mode. Alternatively, the common electrode is formed along with the pixel electrode Ep on the lower glass substrate in devices employing a horizontal electric field driving method, such as an IPS (In-Plane Switching) mode or an FFS (Fringe Field Switching) mode. Polarizers with the optical axes perpendicularly crossing each other are respectively applied to the upper substrate and the lower substrate of the liquid crystal display panel 100. Alignment films for setting the pre-tilt angle of liquid crystal molecules are then formed in the interfaces of the respective polarizers which face the liquid crystal.

Figure 6:
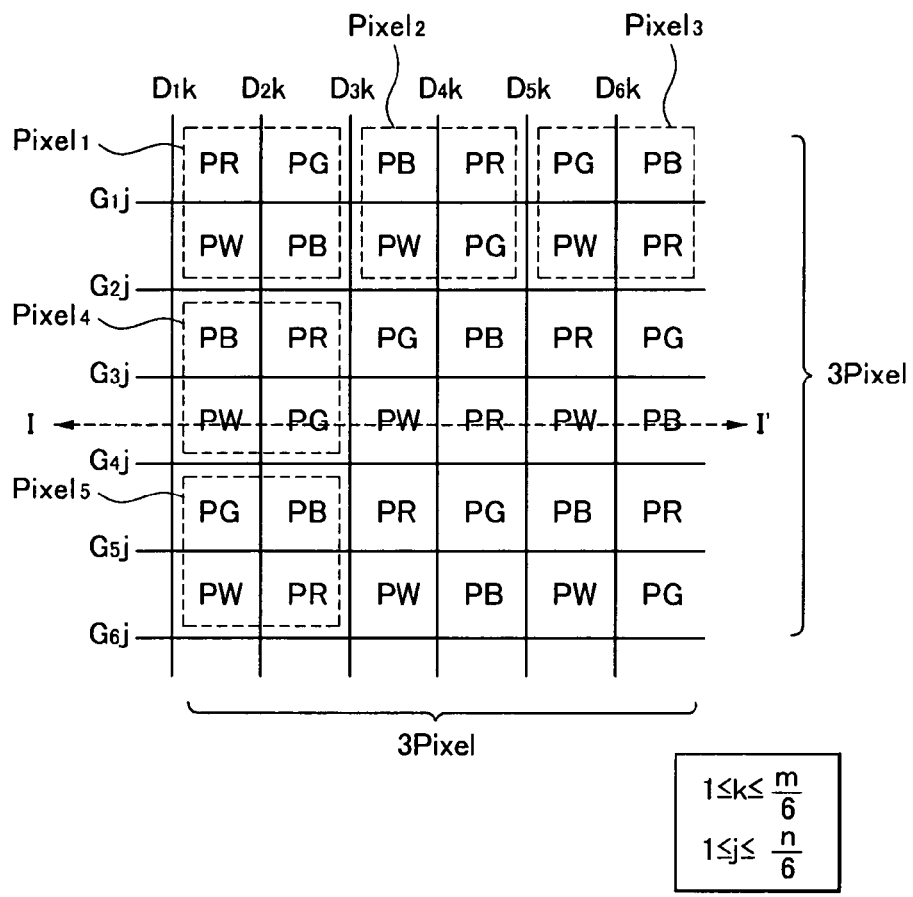
FIG. 6 is a view showing that R, G, and B subpixels in quad type pixels have a different arrangement for each of the quad type pixels adjacent horizontally or vertically to each other.
Figure 7:
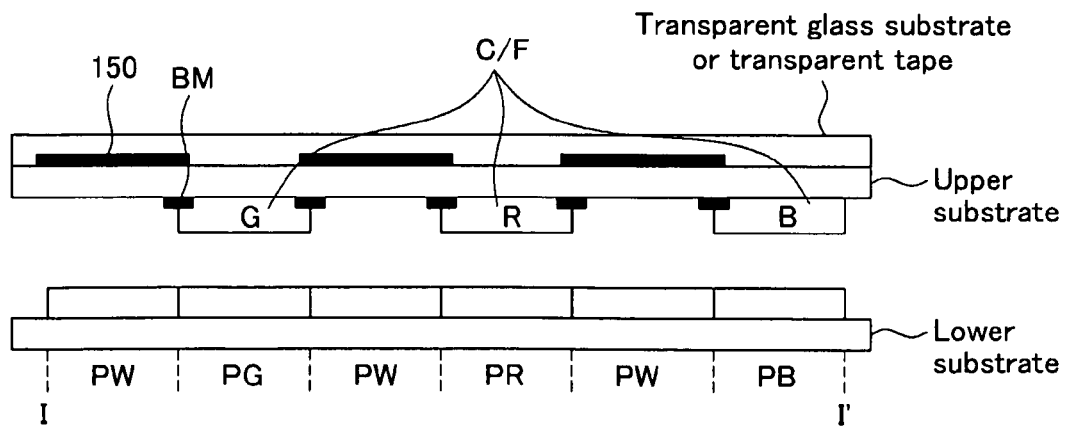
FIG. 7 is a view for explaining the arrangement position of a barrier pattern.

In such a liquid crystal display panel 100, RGBW subpixels PR, PG, PB, and PW adjacent in horizontal and vertical directions constitute one quad type pixel. W subpixels PW in quad type pixels are fixedly disposed at specific positions of the quad type pixels, respectively. In contrast, the R, G, and B subpixels in the quad type pixels have a different arrangement for each of the quad type pixels adjacent horizontally or vertically to each other in order to prevent a color shift in a side viewing angle direction. More specifically, as shown in FIG. 6, the W subpixels PW are allocated to the crossing regions of odd-numbered data lines D1$k$, D3$k$ and D5$k$ and even-numbered gate lines G2$j$, G4$j$, and G6$j$, and hence they are fixed at specific positions of all of the quad type pixels. However, the arrangement position of the R, G, and B subpixels PR, PG, and PB rolls clockwise or counterclockwise among the quad type pixels adjacent horizontally or vertically to each other as seen in the first to fifth quad type pixels Pixels 1 to 5. For example, a quad type pixel Pixel 2 having subpixels PB, PR, and PG arranged in the order of B-R-G is adjacently disposed at the right side of a quad type pixel Pixel 1 having subpixels PR, PG, and PB arranged in the order of R-G-B, and a quad type pixel Pixel 4 having subpixels PB, PR, and PG arranged in the order of B-R-G is adjacently disposed below the quad type pixel Pixel 1 having subpixels PR, PG, and PB arranged in the order of R-G-B. In addition, a quad type pixel Pixel 3 having subpixels PG, PB, and PR arranged in the order of G-B-R is adjacently disposed at the left side of the quad type pixel Pixel 1 having subpixels PR, PG, and PB arranged in the order of R-G-B, and a quad type pixel Pixel 5 having subpixels PG, PB, and PR arranged in the order of G-B-R is adjacently disposed above the quad type pixel Pixel 1 having subpixels PR, PG, and PB arranged in the order of R-G-B. The quad type pixels thusly rendered are repetitively disposed within the liquid crystal display panel 100 in units of 3 (pixels)×3 (pixels). Accordingly, the degree of light shielding among the R, G, and B subpixels PR, PG, and PB in each of the unit pixels comprising 9 quad type pixels is made equal by rendering.

Figure 1:
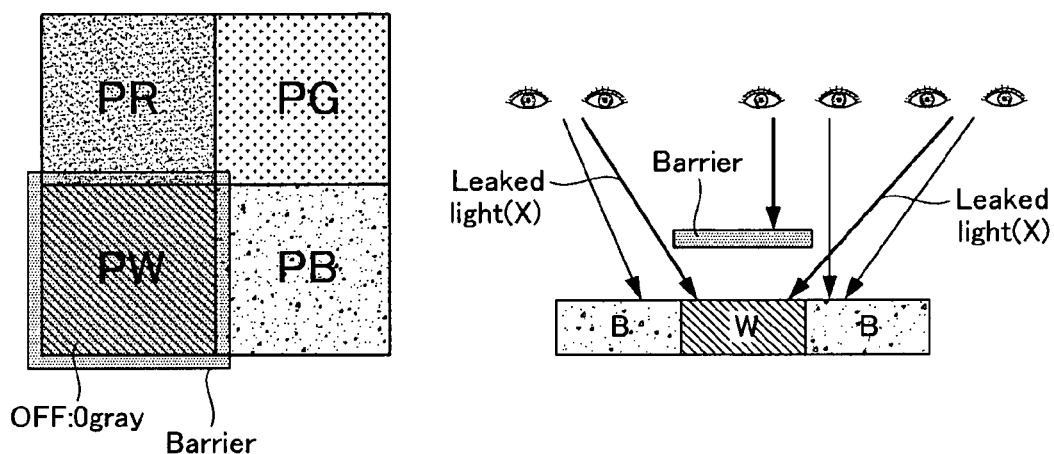
FIG. 1 is a view showing the driving of a quad type pixel in a wide viewing angle mode.
Figure 2:
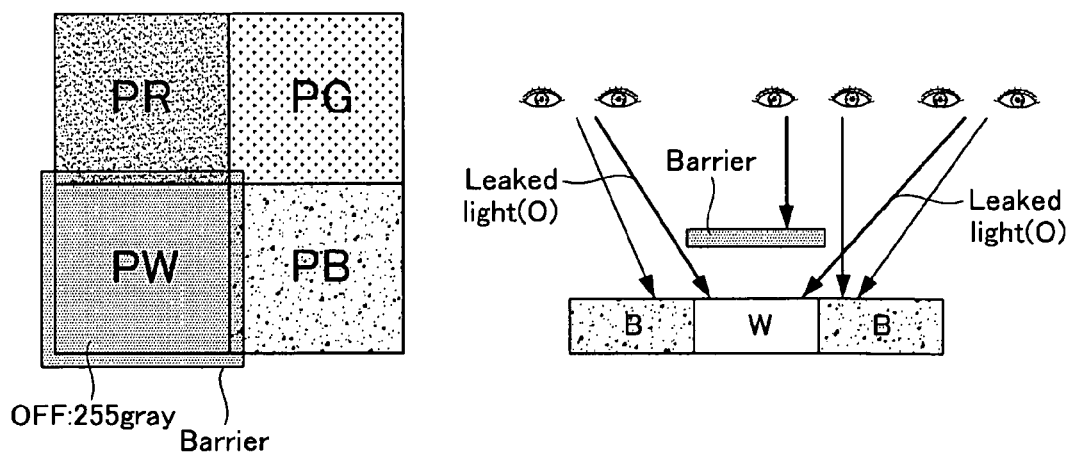
FIG. 2 is a view showing the driving of a quad type pixel in a narrow viewing angle mode.
Figure 3:
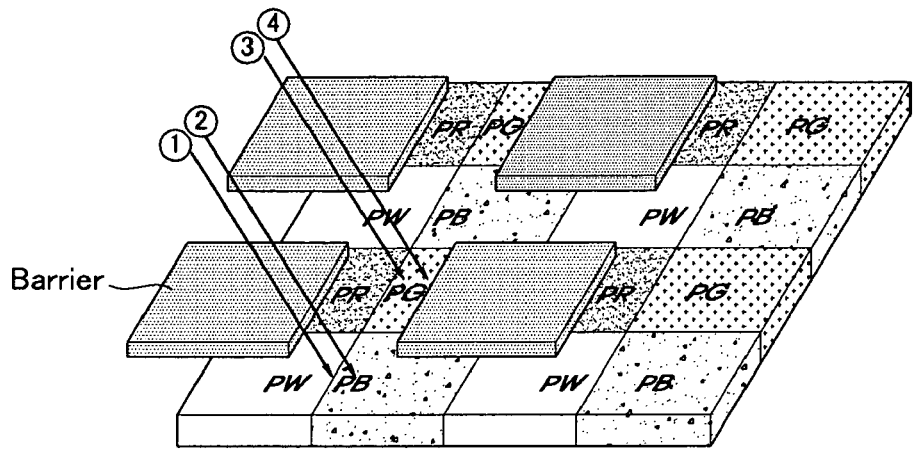
FIG. 3 is a view for explaining that there occurs a difference in the degree of light shielding from a side viewing angle in the conventional art.
Figure 4:
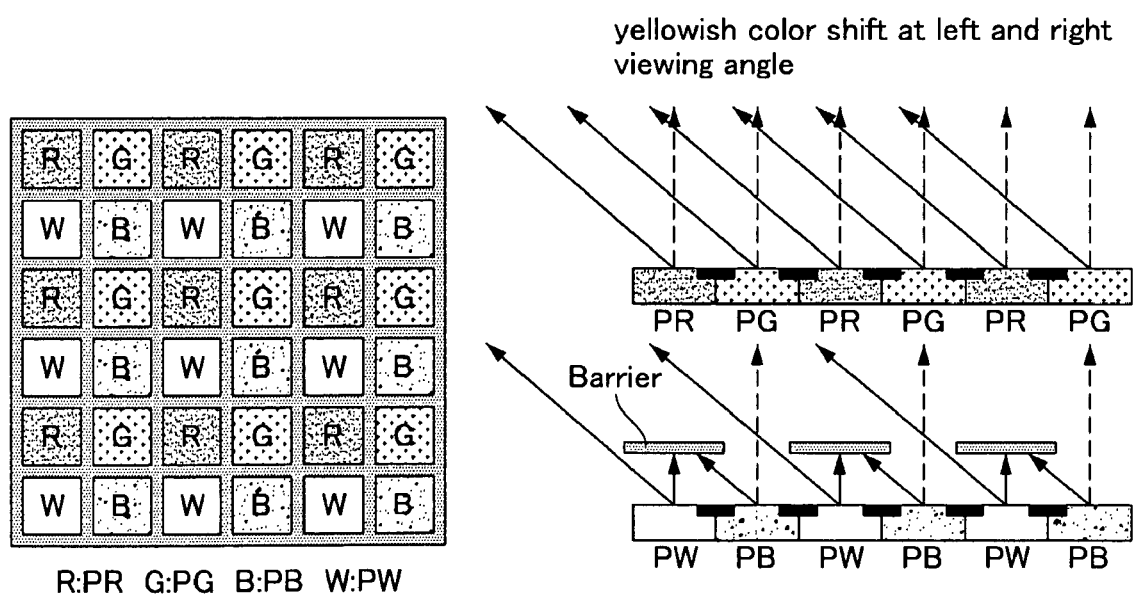
FIG. 4 is a view for explaining that there occurs a color shift due to the difference in the degree of light shielding from a side viewing angle in the conventional art.

As shown in FIG. 2, a barrier pattern 150 is disposed on an image display surface of the liquid crystal display panel 100, and patterned to correspond to the W subpixels PW of the liquid crystal panel 100, thereby blocking light from the W subpixels W in a front viewing angle direction and leaking the light in a side viewing angle direction. The barrier pattern 150 may be formed by patterning a black resin or the like through which light cannot permeate. A target material on which the barrier pattern 150 is patterned may be a transparent glass substrate, or a transparent tape. On the upper substrate of the liquid crystal panel 100, a black matrix BM, color filters CF and an overcoat layer (not shown) are formed. The black matrix BM is formed of a metal, such as a chrome oxide (CrOx) having an optical density higher than 3.5, or chrome, or formed of a carbon group organic material. The black matrix BM serves to prevent occurrence of light leakage in a region where the thin film transistor TFT of the lower substrate is formed, in a region where the gate lines and the data lines are formed, and in the surrounding regions. The color filters C/F include a red layer R to be formed on the R subpixels PR, a green layer G to be formed on the G subpixels PG, and a blue layer B to be formed on the B subpixels PB. No color filter is formed on the W subpixels PW.

The data driver 110 samples and latches digital RGB data supplied from the timing controller 130 in both the wide viewing angle mode and the narrow viewing angle mode in response to a data control signal DDC. The data driver 110 converts the latched digital RGB data into analog data voltages suitable for realizing a gray scale level on the basis of a gamma reference voltage supplied from the outside and supplies the analog data voltages to the data lines D1 to Dm. Furthermore, the data driver 110 samples and latches W disenable data supplied from the timing controller 130 in the wide viewing angle mode in response to the data control signal DDC. The data driver 110 converts the latched W disenable data into disenable data voltages identical to a common voltage on the basis of the gamma reference voltage supplied from the outside and supplies the disenable data voltages to the data lines D1, D3, . . . , Dm−1 to which the W subpixels PW are connected. Furthermore, the data driver 110 samples and latches W data supplied from the timing controller 130 in the narrow viewing angle mode in response to the data control signal DDC. The data driver 110 converts the latched W data into W data voltages suitable for realizing a gray scale level on the basis of the gamma reference voltage supplied from the outside and supplies the W data voltages to the data lines D1, D3, . . . , Dm−1 to which the W subpixels PW are connected.

The gate driver 120 sequentially generates a scan pulse in response to a gate control signal GDC supplied from the timing controller 130 to supply it to the gate lines G1 to Gn. The scan pulse is swung between a gate high voltage for turning on the thin film transistor TFT and a gate low voltage for turning off the thin film transistor TFT.

The timing controller 130 generates a data control signal DDC controlling the supply of the RGB data and/or the W data to supply the data to the data driver 110 by using a vertical synchronization signal Vsync, a horizontal synchronization signal Hsync, and an input clock DCLK. The timing controller 130 generates a gate control signal GDC for controlling the supply of the scan pulse to supply the data to the gate driver 120 by using a vertical synchronization signal Vsync, a horizontal synchronization signal Hsync, and an input clock DCLK. The data control signal DDC includes a source shift clock SSP, a polarity control signal POL, and a source output enable signal SOE. The gate control signal GDC includes a gate start pulse GSP, a gate shift clock GSc, and a gate output enable signal GOE.

In the narrow viewing angle mode, the timing controller 130 calculates the average brightness of the RGB data and maps the calculated average brightness with the W data stored by an experiment, to thus determine W data for reducing visibility by decreasing the contrast ratio at a side viewing angle. This W data is mixed with input RGB data, re-aligned in accordance with the pixel structure of quad type to be rendered, and supplied to the data driver 110. In the wide viewing angle mode, the timing controller 130 mixes the W disenable data with input RGB data so as to prevent the driving of the W subpixels PR formed on the liquid crystal display panel 110, and re-aligns the mixed W disenable data and RGB data in accordance with the pixel structure of quad type to output the aligned data to the data driver 110.

The user interface 140 is used to input a viewing angle selection signal SEL for selecting the wide viewing angle mode or the narrow viewing angle mode. The use interface 140 can be implemented by a keyboard, a mouse, a touch panel, and an OSD (On Screen Display). When the viewing angle selection signal SEL is inputted by the user, the user interface 140 analyzes this signal and supplies it to the timing controller 130.

Such a liquid crystal display according to the present invention can improve a color shift in a side viewing angle direction, and can variously adjust the size of the barrier pattern 150 and/or the aperture area of the W subpixels PW in order to increase the visibility in a front viewing angle direction and decrease the visibility in a side viewing angle direction when the wide viewing angle mode is selected.

Figure 8:
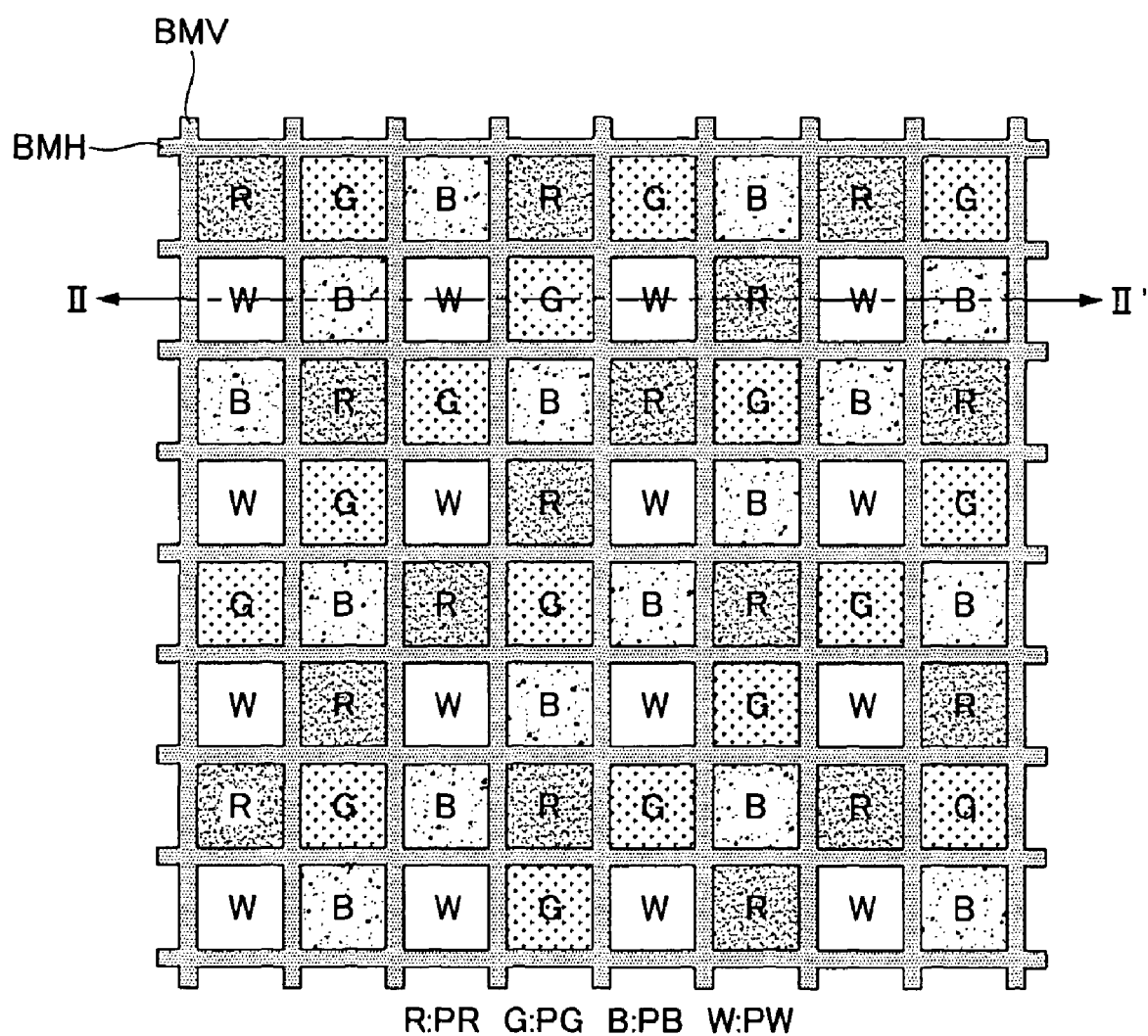
FIG. 8 is a plan view showing a liquid crystal display according to a first embodiment of the present invention.
Figure 9:
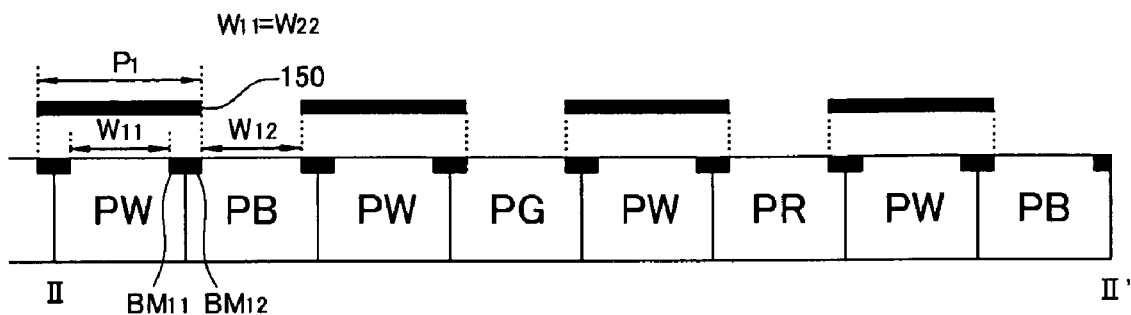
FIG. 9 is a cross sectional view taken along line II-II' of FIG. 8.

FIG. 8 is a plan view showing a liquid crystal display according to a first embodiment of the present invention. FIG. 9 is a cross sectional view taken along line II-II' of FIG. 8.

Referring to FIGS. 8 and 9, in the liquid crystal display according to the first embodiment of the present invention, R, G, and B subpixels PR, PG, and PB in quad type pixels are disposed to have a different arrangement for each of the quad type pixels adjacent horizontally or vertically to each other in order to improve a color shift in a side viewing angle direction. In the wide viewing angle mode, the size of a barrier pattern 150 is larger than the aperture area of W subpixels PW in order to increase visibility in a front viewing angle direction by completely blocking light leaked from the W subpixels PW. To this end, in the liquid crystal display according to the first embodiment of the present invention, the width of a black matrix BMV in the longitudinal direction is larger than the width of a black matrix BMH in the transverse direction in the entire regions of the liquid crystal display panel, and the horizontal width P1 of the barrier pattern 150 is extended to a black matrix BM12 of the R, G, and B subpixels PR, PG, and PB beyond a black matrix BM11 of the W subpixels. Accordingly, the horizontal width P1 of the barrier pattern 150 is relatively larger than the horizontal width W11 of the opened surface of the W subpixels PW, thereby much improving visibility in the front viewing angle direction upon driving in the wide viewing angle mode. In the liquid crystal display according to the first embodiment, the horizontal width W11 of the opened surface of the W subpixels PW and the horizontal width W12 of the opened surface of the R, G, and B subpixels PR, PG, and PB are equal to each other.

Figure 10:
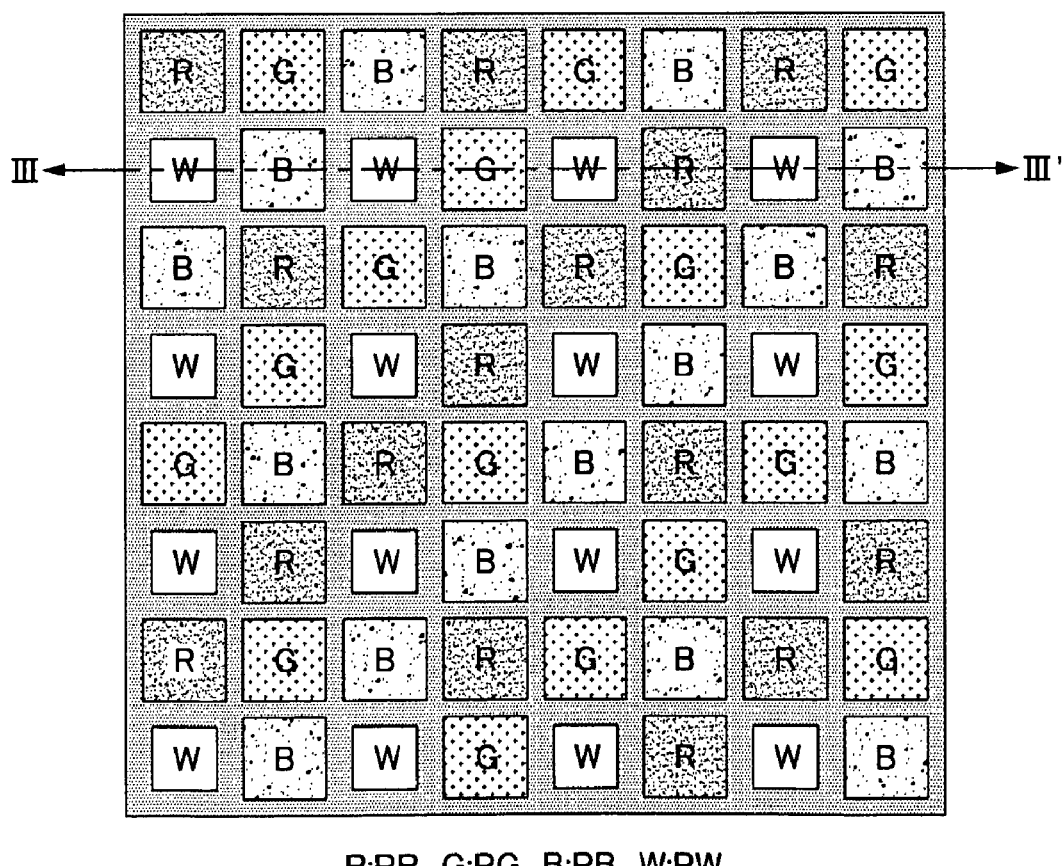
FIG. 10 is a plan view showing a liquid crystal display according to a second embodiment of the present invention.
Figure 11:
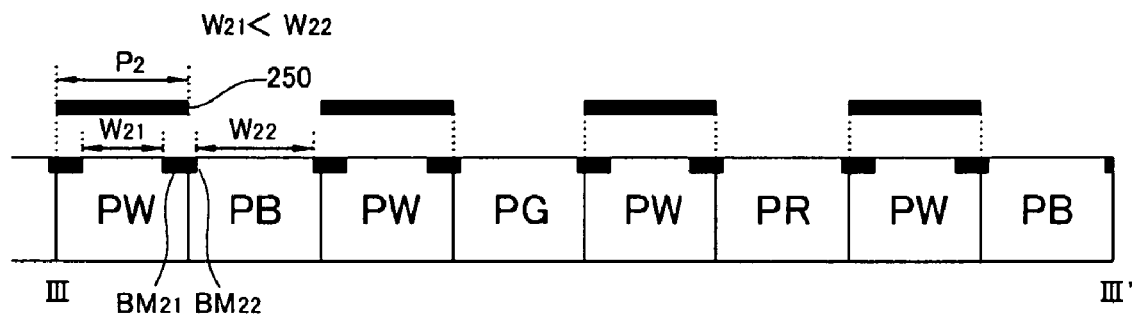
FIG. 11 is a cross sectional view taken along line III-III' of FIG. 10.

FIG. 10 is a plan view showing a liquid crystal display according to a second embodiment of the present invention. FIG. 11 is a cross sectional view taken along line III-III' of FIG. 10.

Referring to FIGS. 10 and 11, in the liquid crystal display according to the first embodiment of the present invention, R, G, and B subpixels PR, PG, and PB in quad type pixels are disposed to have a different arrangement for each of the quad type pixels adjacent horizontally or vertically to each other in order to improve a color shift in a side viewing angle direction. In the wide viewing angle mode, the size of a barrier pattern 250 is larger than the aperture area of W subpixels PW in order to increase visibility in a front viewing angle direction by completely blocking light leaked from the W subpixels PW. To this end, in the liquid crystal display according to the second embodiment of the present invention, the width of a black matrix BM21 is larger than the width of a black matrix BM22 of the R, G, and B subpixels in up, down, left and right directions. Thus, the aperture area of the W subpixels PW is decreased, and the horizontal width P2 of the barrier pattern 250 is extended only to a black matrix BM11 of the W subpixels PW. Accordingly, the horizontal width P2 of the barrier pattern 250 is relatively larger than the horizontal width W11 of the opened surface of the W subpixels PW, thereby improving visibility in the front viewing angle direction upon driving in the wide viewing angle mode. Further, because the aperture area of the R, G, and B subpixels PR, PG, and PB is increased compared to the first embodiment, the luminance of the liquid crystal display is not lowered. In the liquid crystal display according to the second embodiment, the horizontal width W11 of the opened surface of the W subpixels PW is smaller than the horizontal width W21 of the opened surface of the R, G, and B subpixels PR, PG, and PB.

Figure 12:
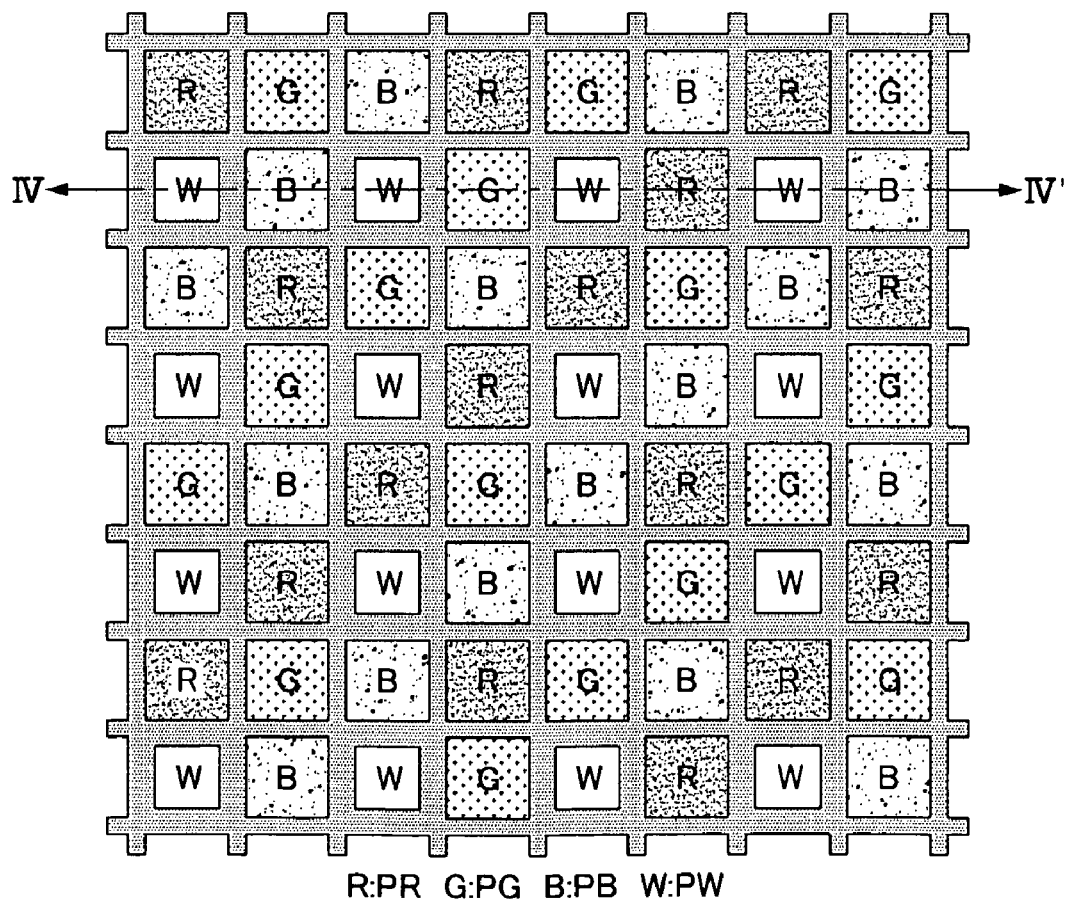
FIG. 12 is a plan view showing a liquid crystal display according to a third embodiment of the present invention.
Figure 13:
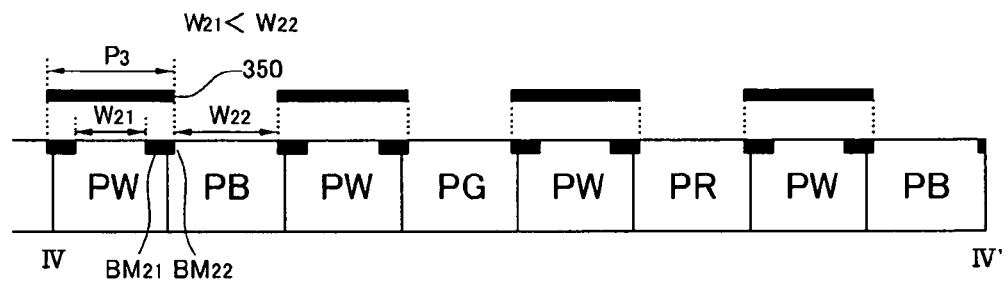
FIG. 13 is a cross sectional view taken along line IV-IV' of FIG. 12.

FIG. 12 is a plan view showing a liquid crystal display according to a third embodiment of the present invention. FIG. 13 is a cross sectional view taken along line IV-IV' of FIG. 12.

Referring to FIGS. 12 and 13, in the liquid crystal display according to the first embodiment of the present invention, R, G, and B subpixels PR, PG, and PB in quad type pixels are disposed to have a different arrangement for each of the quad type pixels adjacent horizontally or vertically to each other in order to improve a color shift in a side viewing angle direction. In the wide viewing angle mode, the size of a barrier pattern 350 is larger than the aperture area of W subpixels PW in order to increase visibility in a front viewing angle direction by completely blocking light leaked from the W subpixels PW. To this end, in the liquid crystal display according to the third embodiment of the present invention, the width of a black matrix BM21 is larger than the width of a black matrix BM22 of the R, G, and B subpixels in up, down, left and right directions. Thus, the aperture area of the W subpixels PW is decreased, and the horizontal width P2 of the barrier pattern 350 is extended to a black matrix BM12 of the R, G, and B subpixels PR, PG, and PB beyond a black matrix BM11 of the W subpixels PW. Accordingly, the horizontal width P3 of the barrier pattern 350 is relatively larger than the horizontal width W11 of the opened surface of the W subpixels PW, thereby much more improving visibility in the front viewing angle direction upon driving in the wide viewing angle mode. Further, because the aperture area of the R, G, and B subpixels PR, PG, and PB is increased compared to the first embodiment, the luminance of the liquid crystal display is not lowered. The liquid crystal display according to the third embodiment is substantially identical to the liquid crystal display according to the second embodiment except for the size of the barrier pattern 350. In the liquid crystal display according to the third embodiment, the horizontal width W21 of the opened surface of the W subpixels PW is smaller than the horizontal width W22 of the opened surface of the R, G, and B subpixels PR, PG, and PB.

Figure 14:
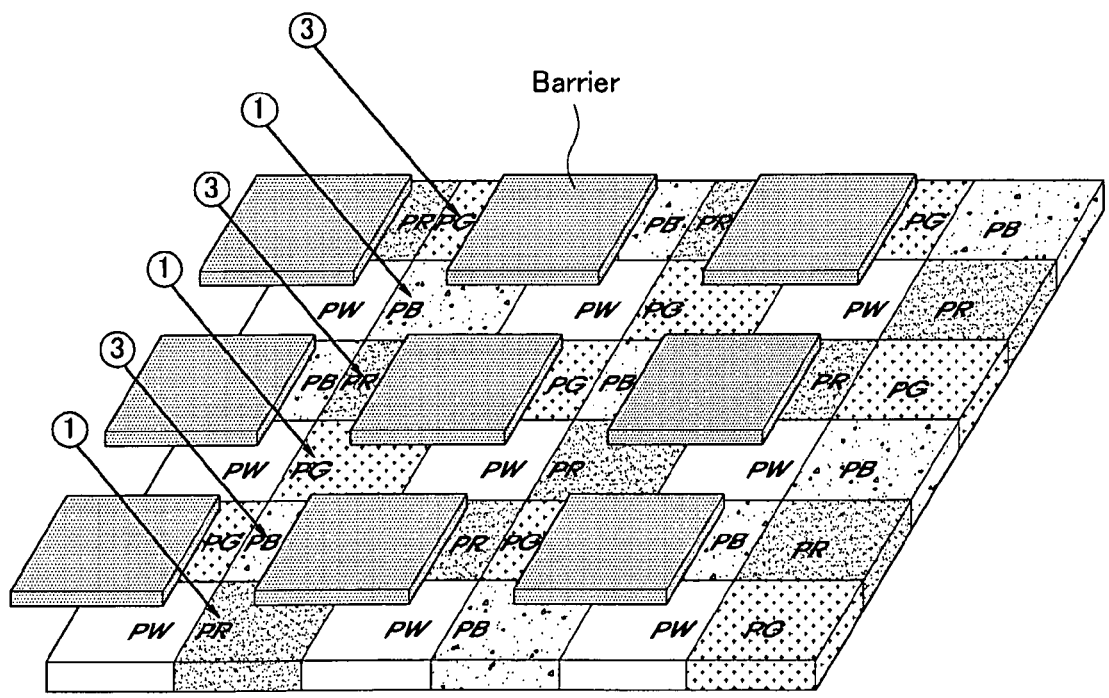
FIGS. 14 and 15 are views for explaining the compensation of a difference in the degree of light shielding of a barrier on RGB subpixels in a side viewing angle direction according to the embodiments of the present invention.
Figure 15:
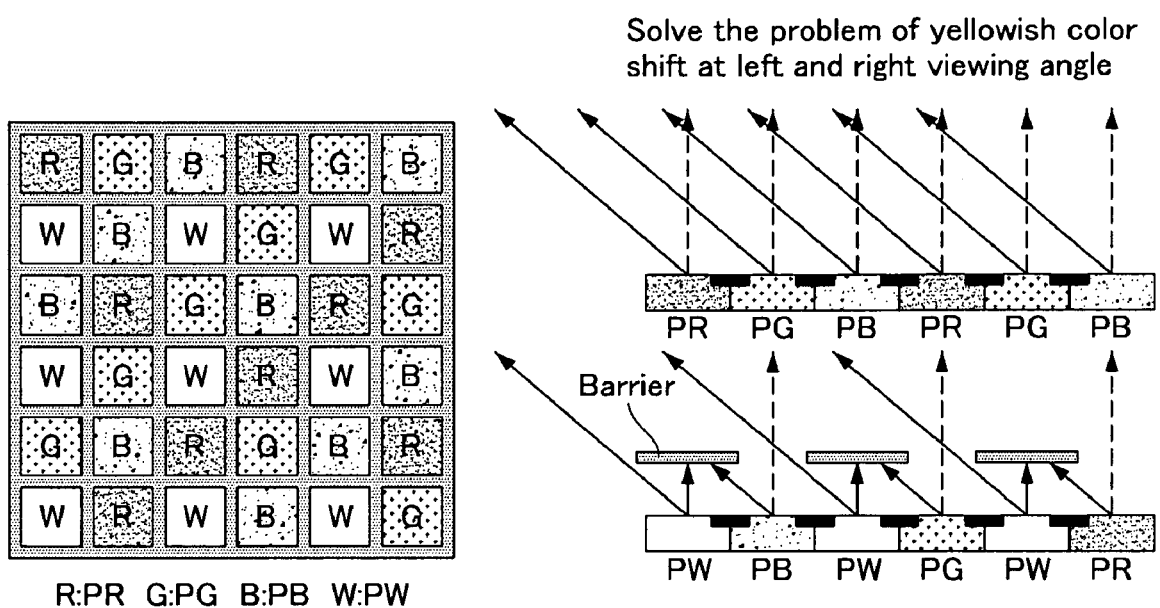

FIGS. 14 and 15 are views for explaining the compensation of a difference in the degree of light shielding of a barrier on RGB subpixels PR, PG, and PB in a side viewing angle direction by varying the arrangement of the R, G, and B subpixels PR, PG, and PB for each of the quad type pixels adjacent horizontally or vertically to each other according to the embodiments of the present invention.

Referring to FIGS. 14 and 15, in the liquid crystal display according to the embodiments of the present invention, the arrangement of R, G, and B subpixels PR, PG, and PB rolls clockwise or counterclockwise for each of the quad type pixels adjacent horizontally or vertically to each other unlike the conventional art in which the subpixels of all of the quad type pixels are fixedly disposed at specific positions. Due to this rolling, an image in the side viewing angle direction ① whose degree of light shielding by barriers is relatively high is not fixed as an image of the B subpixels PB but represented as a mixed image of the RGB subpixels PR, PG, and PB. Further, an image in the side viewing angle direction ③ whose degree of light shielding by barriers is relatively low is not fixed as an image of the G subpixels PG or R subpixels PR but represented as a mixed image of the RGB subpixels PR, PG, and PB. In other words, even if the size of the RGP aperture regions exposed in a side viewing angle direction is varied according to a viewing angle, if the arrangement of the R, G, and B subpixels PR, PG, and PB is rolled clockwise or counterclockwise for each of the quad type pixels adjacent horizontally or vertically to each other, the average amount of images sensed by the observer from a side viewing angle is all the same in the R, G, and B subpixels PR, PG, and PB. Accordingly, it is possible to prevent a greenish or yellowish color shift caused by a difference in the degree of light shielding among the R, G, and B subpixels at a side viewing angle.

As described above, the liquid crystal display according to the embodiments of the present invention, a color shift is prevented by compensating for a difference in the degree of light shielding in a side viewing angle direction, thereby much improving display quality.

From above-describe details, those skilled in the art will appreciate that various changes and modifications are possible without departing from the technical spirit of the invention. Accordingly, the scope of the invention must not be limited to only details of the above-described embodiment, but defined by the claims.

What is claimed is:

1. A liquid crystal display, comprising:
a plurality of quad type pixels each having an R subpixel, a G subpixel, a B subpixel, and a W subpixel; and
a plurality of light blocking patterns disposed on the W subpixels, for guiding light from the W subpixels to a side viewing angle,
wherein the W subpixels are fixed at specific positions of the quad type pixels respectively, and the R, G, and B subpixels have a different arrangement for each of the quad type pixels adjacent horizontally or vertically to each other, wherein a quad type pixel having subpixels arranged in the order of B-R-G is adjacently disposed at the right side of a quad type pixel having subpixels arranged in the order of R-G-B:
a quad type pixel having subpixels arranged in the order of B-R-G is adjacently disposed below the quad type pixel having subpixels arranged in the order of R-G-B;
a quad type pixel having subpixels arranged in the order of G-B-R is adjacently disposed at the left side of the quad type pixel having subpixels arranged in the order of R-G-B; and
a quad type pixel having subpixels arranged in the order of G-B-R is adjacently disposed above the quad type pixel having subpixels arranged in the order of R-G-B.

2. The liquid crystal display of claim 1, wherein each of the quad type pixels is formed in a quadrangular structure including the R, G, and B subpixels and the W subpixel.

3. The liquid crystal display of claim 1, wherein, in the quad type pixels, the arrangement order of the R, G, and B subpixels is repeated in units of 3 (quad type pixels)×3 (quad type pixels).

4. The liquid crystal display of claim 1, wherein the light blocking patterns are patterned on a transparent glass substrate, and the glass substrate having the light blocking patterns is attached to an image display surface of the liquid crystal display panel having the quad type pixels.

5. The liquid crystal display of claim 4, wherein the size of the light blocking patterns is larger than the aperture area of the W subpixels.

6. The liquid crystal display of claim 5, wherein the aperture area of the W subpixels is equal to the aperture area of the respective R, G, and B subpixels.

7. The liquid crystal display of claim 5, wherein the aperture area of the W subpixels is smaller than the aperture area of the respective R, G, and B subpixels.

* * * * *